US007477132B2

(12) United States Patent
Mayer et al.

(10) Patent No.: US 7,477,132 B2
(45) Date of Patent: Jan. 13, 2009

(54) ELECTRONIC DEVICE FOR PACKET BOXES AND RELATED OPERATING METHOD

(75) Inventors: Boris Mayer, Bonn (DE); Guldern Tuna, Bonn (DE)

(73) Assignee: Deutsche Post AG, Bonn (DE)

( * ) Notice: Subject to any disclaimer, the term of this patent is extended or adjusted under 35 U.S.C. 154(b) by 0 days.

(21) Appl. No.: 10/820,586

(22) Filed: Apr. 8, 2004

(65) Prior Publication Data

US 2005/0015349 A1 Jan. 20, 2005

Related U.S. Application Data

(63) Continuation of application No. PCT/DE02/03760, filed on Oct. 7, 2002.

(30) Foreign Application Priority Data

Oct. 9, 2001 (DE) ................................ 101 49 622

(51) Int. Cl.

*B60R 25/00* (2006.01)
*G05B 19/00* (2006.01)
*G06F 7/00* (2006.01)
*H04B 7/00* (2006.01)
*H04Q 1/00* (2006.01)

(52) U.S. Cl. ........................ 340/5.73; 340/5.7; 340/5.9; 340/568.1; 340/572.1; 340/543; 700/233; 700/244; 700/214; 235/381; 235/382

(58) Field of Classification Search ................ 340/5.73, 340/5.7, 5.9, 568.1, 572.1, 569, 539.1, 543, 340/10.31; 700/233, 244, 214, 237, 242; 235/385, 381–382, 378, 375, 380; 232/45, 232/19; 705/418

See application file for complete search history.

(56) References Cited

U.S. PATENT DOCUMENTS

| | | | | |
|---|---|---|---|---|
| 5,051,914 | A | 9/1991 | Sansone et al. | 364/478 |
| 5,068,797 | A | 11/1991 | Sansone et al. | 364/478 |
| 5,072,401 | A | 12/1991 | Sansone et al. | 364/478 |
| 5,212,644 | A * | 5/1993 | Frisch | 705/418 |
| 5,475,378 | A | 12/1995 | Kaarsoo et al. | 340/825.34 |
| 5,774,053 | A * | 6/1998 | Porter | 340/568.1 |
| 6,344,796 | B1 | 2/2002 | Ogilvie et al. | 340/568.1 |
| 6,418,416 | B1 * | 7/2002 | Rosenberg et al. | 705/28 |
| 6,456,900 | B1 * | 9/2002 | Kakuta | 700/233 |
| 6,791,450 | B2 * | 9/2004 | Gokcebay et al. | 340/5.73 |
| 6,879,243 | B1 * | 4/2005 | Booth et al. | 340/5.73 |
| 6,882,269 | B2 * | 4/2005 | Moreno | 340/5.73 |

FOREIGN PATENT DOCUMENTS

| | | |
|---|---|---|
| DE | 196 41 005 A1 | 12/1998 |
| DE | 199 39 211 A1 | 3/2001 |
| DE | 200 21 792 U1 | 4/2001 |
| DE | 100 00 830 A1 | 7/2001 |
| DE | 100 00 830 C2 | 7/2001 |

(Continued)

OTHER PUBLICATIONS

International Search Report in PCT/DE02/03760 dated Aug. 13, 2003.

International Preliminary Examination Report in PCT/DE02/03760 dated Oct. 30, 2003.

International Search Report for PCT/DE03/02693 dated Feb. 26, 2004.

(Continued)

*Primary Examiner*—Brian A Zimmerman
*Assistant Examiner*—Nam V Nguyen
(74) *Attorney, Agent, or Firm*—Marshall, Gerstein & Borun LLP

(57) ABSTRACT

An electronic device for packet boxes includes a processor programmed to assign users to groups of users and a control system capable of managing the possibilities of access to functions of the device on the basis of the user's membership to the user groups.

8 Claims, 3 Drawing Sheets

FOREIGN PATENT DOCUMENTS

| | | | |
|---|---|---|---|
| DE | 201 03 564 | | 7/2001 |
| FR | 2 563 987 | | 11/1985 |
| FR | 2 713 461 | | 6/1995 |
| JP | 09-282531 | | 10/1997 |
| JP | 2000-225052 | | 8/2000 |
| JP | 2001-182396 | | 7/2001 |
| KR | 10-2001-0056150 | | 7/2001 |
| SU | 1617675 | | 12/1990 |
| WO | WO 96/20952 | A2 | 7/1996 |
| WO | WO 96/20952 | A3 | 7/1996 |
| WO | WO 00/51750 | | 9/2000 |
| WO | WO 01/00069 | A2 | 1/2001 |
| WO | WO 01/00069 | A3 | 1/2001 |
| WO | WO 01/30213 | A2 | 5/2001 |
| WO | WO 01/31593 | A1 | 5/2001 |
| WO | WO 01/52199 | A2 | 7/2001 |
| WO | WO 01/52199 | A3 | 7/2001 |
| WO | WO 01/63494 | A2 | 8/2001 |

OTHER PUBLICATIONS

International Preliminary Examination Report for PCT/DE03/02693 dated Nov. 22, 2004.

International Search Report for PCT/DE02/03761 dated Aug. 5, 2003.

International Preliminary Examination Report for PCT/DE02/03761 dated Jan. 26, 2004.

Faerber, Georg, *Prozessrechentechnik, Kapitel 2*, Springer Verlag, Berlin Heidelberg, New York, pp. 3-30, 1979.

St. Laurent et al., *Programming Web Services with XML-RPC*, Sebastopol, CA, 2001 (1 page).

*ONC Remote Procedure Call* (*oncrpc*), Jan. 16, 2001 (1 page). Retrieved from the Internet: <URL: http://www.ietf.org/html.charters/oncrpc-chater.html>.

*Simple Object Access Protocol* (*SOAP*) 1.1, May 2000 (33 pages). Retrieved from the Internet: <URL: http://www.w3org/TR/SOAP>.

* cited by examiner

ELECTRONIC DEVICE FOR PACKET BOXES AND RELATED OPERATING METHOD

CROSS-REFERENCE TO RELATED APPLICATION

This is a continuation of International Application No. PCT/DE02/03760 filed Oct. 7, 2002, the entire disclosure of which is incorporated by reference herein.

BACKGROUND OF THE DISCLOSURE

1. Field of the Disclosure

The disclosure relates to an electronic parcel compartment system with a user interface, whereby the user interface is capable of acquiring information from users of the electronic parcel compartment system, and to a method for operating an electronic parcel compartment system.

2. Brief Description of Related Technology

An electronic parcel compartment system is known from FR 2 563 987, the electronic parcel compartment system of which performs an identification and an authorization of suppliers who place goods into the compartment as well as of customers who pick up goods from the compartment by identifying themselves with a card and inputting a secret number into an operating terminal that serves to check the identity of the card holder.

DE 100 00 830 A1 describes a locker installation having a computer that controls the electronic locking system of the locker installation and that administers the authorizations to access the locker installation. A deliverer who identifies himself by means of an electronic key system can select a suitable compartment and can have it opened after entering the customer number of the person who is going to pick up the delivery, said number serving the deliverer as the address. After the compartment is filled, it is closed and can no longer be opened by the deliverer. A person picking up the delivery likewise identifies himself by means of an electronic key system based on his customer number and gains access to the compartments containing parcels addressed to him. The person picking up deliveries has the possibility to place return shipments into the compartment.

WO 01/31593 A1 describes an electronic delivery system in which, via a network, products ordered from a merchant are placed into a locker installation by a shipping company and they are retrieved from this locker by the customer. The user of the locker installation identifies himself by an access key, thereby gaining access to the functions of the locker installation. The delivery system can be operated in such a way that the seller, the customers, and the shipping company are designated as a single group so that functions can be accessed by multiple groups.

SUMMARY OF THE DISCLOSURE

The disclosure is based on the objective of creating an electronic parcel compartment system that can be used as flexibly as possible.

Accordingly, this objective is achieved in that the electronic parcel compartment system is configured in such a way that the electronic parcel compartment system includes means for assigning the users to user groups and in that the electronic parcel compartment system is provided with a system control that controls possibilities to access functions of the electronic parcel compartment system, depending on the user group to which the user belongs.

The disclosed method and system preferably configure an electronic parcel compartment system with different function modules, whereby access to the individual function modules is only possible for certain users.

In order to combine the greatest possible flexibility in the handling of the parcel compartment system with a high security against fraudulent access to protected functions and also in order to ensure a special flexibility in the utilization by different users, such utilization is carried out separately for different user groups.

A user group is a group of persons with the same access profile to the delivery machine, that is to say with the same procedures at the delivery machine.

The user group to which a user of the parcel compartment system belongs can be ascertained in various ways.

Thus, for example, it is advantageous for the means that assigns the users to user groups to make this assignment on the basis of information transmitted via a data line.

An advantageous embodiment of the parcel compartment system and of the method for operating it is characterized in that the means for assigning users to user groups is connected to the user interface in such a way that the information acquired from the user interface is available to said means for the assignment of the users.

In an especially preferred embodiment of the parcel compartment system and of the method for operating it, the assignment to the user groups is performed by acquiring user identification information and comparing the user identification information with an entry in a database.

Moreover, it is advantageous that, for different user groups, different authorizations to access functions of the electronic parcel compartment system can be selected.

Furthermore, it is advantageous that certain parcel compartments and/or groups of parcel compartments are accessible only to certain user groups.

In this manner, it is possible to offer different classifications of users and different classes of service.

By assigning different parcel compartments and/or areas of parcel compartments, a gradation of classes of delivery is possible.

For example, a premium service can be implemented that comprises a guaranteed delivery form.

Such a premium delivery option is especially suitable for shipping high-value and/or urgent items such as medications or spare parts for crucial installations.

BRIEF DESCRIPTION OF THE DRAWING

Additional advantages, special features, and practical refinements of the disclosure may be apparent from the following presentation of preferred embodiments with reference to the accompanying drawings.

DETAILED DESCRIPTION

The following provides an example of implementation of the system and method, based on a comprehensive logistic system with six different user groups.

The number of user groups as well as the requestable functions of the electronic parcel compartment system assigned to them are freely variable.

In particular, the example of six different user groups can be extended to any desired number of user groups. The number is adapted to the properties of the parcel compartment system, of the method for operating it and of the logistic system.

However, it is particularly advantageous to provide the following user groups: postal service deliverers to the delivery machine (deliverer); customer (registered recipient); B2B (business-to-business customer (registered B2B recipient); deliverer B2B; maintenance technician (master); and, delivery machine manufacturer.

Figure 1:
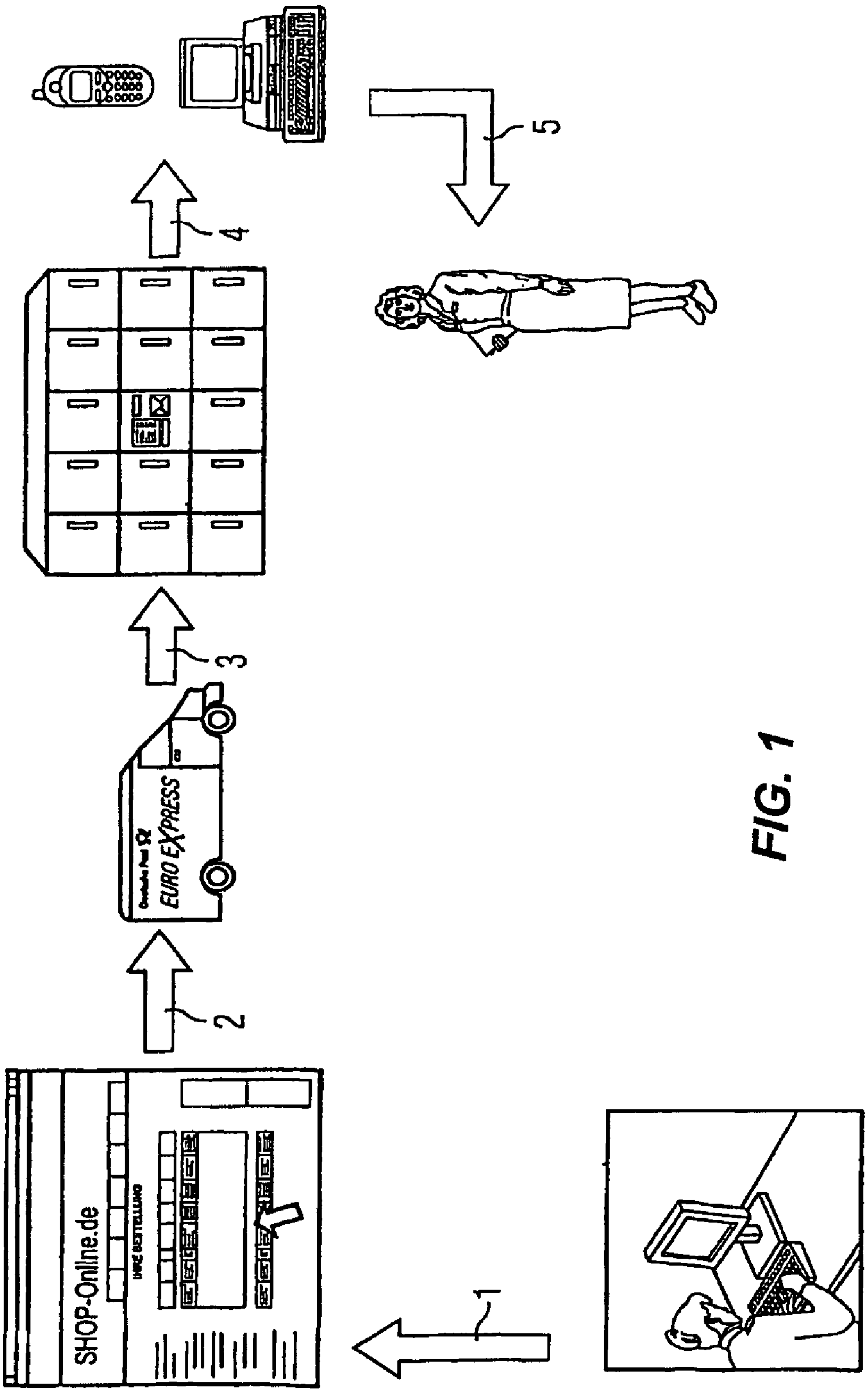
FIG. 1 is a schematic diagram of a parcel compartment system according to the disclosure.
Figure 2:
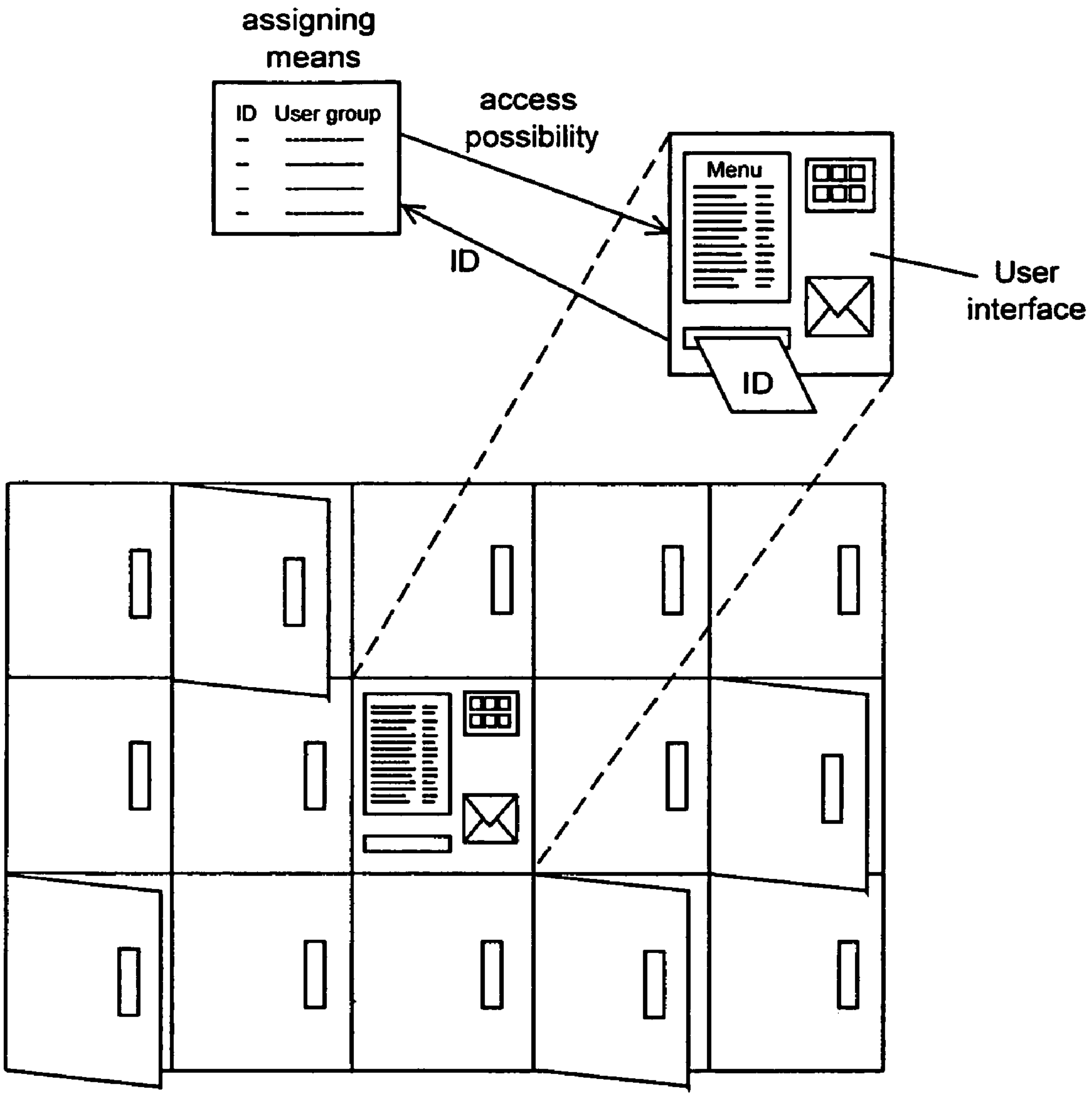
FIG. 2 is schematic diagram of an example of a user interface and assignment means of the compartment system of FIG. 1 according to the disclosure.
Figure 3:
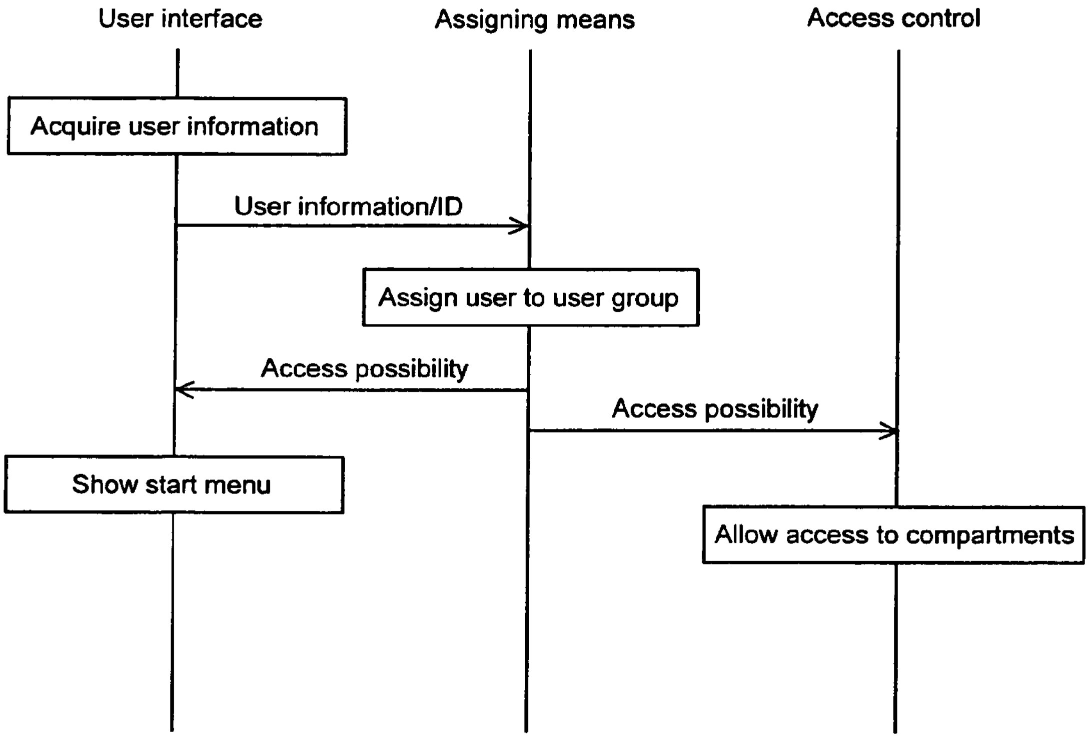
FIG. 3 is a flowchart of examples of functions of the parcel compartment system of FIG. 1 according to the disclosure.

As can be seen in FIG. 1, once a customer card has been inserted into a reading device, "Call Center" functionalities are available to all of the user groups. After the recipient or the deliverer has inserted his card, it preferably does not remain in the reading device. It is immediately ejected so that, in case of problems, the post number printed on the card can be used within the scope of the Call Center functionality.

On the basis of an ascertainable criterion, a user is assigned to a user group. The assignment can be done is a fixed manner, for example, in that certain identification codes or sets of numbers are only assigned to certain user groups. However, it is likewise advantageous to carry out a dynamic assignment of users to user groups.

Such a dynamic assignment of users to user groups is done, for example, in that data for assigning the users to user groups are transmitted by a suitable server.

The assignment of the users is preferably carried out parallel to the authentication of the users.

Once the sign-in has been successful, the user menu of the particular user group is displayed.

1. A user comes to the delivery machine.
2. The delivery machine prompts the user on the monitor to insert a customer card.
3. The customer card is inserted. This procedure is described by a corresponding image on the delivery machine, moreover, a depiction of the customer card should be shown on the insertion slit.
4. The post number is read off the card. If this is not possible, the recipient is requested to enter the post number manually.
5. The post number is checked. If it is wrong, it is manually requested. This is repeated until the third manual entry, after which a reference to the hotline is given. The delivery machine goes back to item 1 now, or after 30 seconds without input.
6. If the post number is correct, the delivery machine requests the user to enter a "postal service customer PIN" number (a personal identification number) which serves for identification at the delivery machine. The examination consists of checking the postal service customer PIN to see if it matches the post number. The postal service customer PIN has to be blocked for 24 hours after the third incorrect entry (for deliverers, after the fifth entry). Moreover, the card holder should be informed by e-mail message or by SMS message about the blocking and about the possibility of being released again by the Call Center. It is advantageous that, after a predefinable time interval, a blocked postal service customer PIN can be released, or is automatically released. If the postal service customer PIN matches the customer number, the user type is ascertained on the basis of the post number. The user types are preferably defined by the electronic parcel compartment system on the basis of sets of numbers within the post number.
7. The user is given access to the particular starting menu of his user group.

Individual function profiles of the various user groups are described below:

Standard Deliveries

The deliverer removes from the parcel compartment system the shipments whose storage times have been exceeded in order to send them back. The deliverer also fills the parcel compartment system with mailpieces. Preferably, the mailpieces are postal parcels, packages, and cash-on-delivery ("COD") packages. However, the mailpieces can likewise be letters. The deliverer of the shipping service provider preferably does not have access to the area of the delivery machine that is reserved for the B2B deliverers.

Standard Recipients

In a first step, this user group includes those users who only pick up shipments from the parcel compartment system; in a second step, the possibility to make a delivery to the parcel compartment system should also be made available. Returned material and prepaid products are ideal for this scenario.

B2B Recipients

Unlike the above-mentioned recipients, B2B recipients can not only pick up shipments from the delivery machine, but can also place returned material for the B2B deliverer. Returned materials in the B2B area are defined as shipments, partial shipments or containers that should be or have to be returned to the sender. When returned materials are handed in, they are limited to the B2B area of the delivery machine. B2B recipients can select "Hand in returned material" on the user menu, then an overview of the free compartments (depending on the compartment size) is displayed and the B2B recipient selects a compartment and can place his returned materials into it once it has opened.

B2B Deliverer

The B2B deliverer delivers shipments for B2B recipients and, if applicable, picks up shipments placed there by these recipients. It is recommended to combine the compartments of the B2B area of a delivery machine in terms of their position. In this way, the B2B recipient and the B2B deliverer can find their way more easily in the delivery machine. The B2B deliverer has access to all of the compartments in the B2B area of the delivery machine, that is to say, if necessary, he can have all of the empty compartments opened by the delivery machine, for example, as is done for rapid loading in locker systems. Rapid loading is a mass loading of a delivery machine by opening several parcel compartments, preferably of an entire section of compartments. As such, a function can be activated that causes an essentially simultaneous opening of several parcel compartments after a user has been assigned to a user group.

Maintenance Technicians

Basically, the maintenance technician should be able to perform all jobs on the delivery machine. If necessary, he should remove shipments for recipients and should forward them via a special delivery procedure. The function distribution in the electronic parcel compartment system is configured in such a way that appropriately authorized employees can remove return shipments as well as deliver and pick up shipments. In an especially high authorization level, these tasks can be carried out for all of the areas of the parcel compartment system. This especially high authorization level includes the capability of performing maintenance and error-checking functions of the parcel compartment system and of opening all compartments of the parcel compartment system. These access rights are authenticated with a master customer card and a postal service customer PIN. After the post number of the recipient with a complaint has been entered, the shipments are displayed. All regular parcels can be removed immediately. COD shipments are taken out and are further processed, analogously to the standard postal methods (with a manual list and replacement payment slip), and the scanner.

Delivery Machine Manufacturer

Personnel of the delivery machine manufacturer or personnel of commissioned companies can carry out all necessary tasks on the delivery machine in order to provide their service in accordance with the technical service description.

Overview of User Groups

| Groups | Standard deliverer | Standard recipient | B2B recipient | B2B deliverer | Maintenance technician | Delivery machine manufacturer |
|---|---|---|---|---|---|---|
| Tasks | | | | | | |
| Receive shipments | ✓ | ✓ | ✓ | ✓ | ✓ | |
| Deliver shipments | ✓ | | | ✓ | ✓ | |
| Repairs/Maintenance | | | | | ✓ | ✓ |
| Place returned materials | | | ✓ | | | |

As already described, a distinction can be made among the user groups, on the basis of the authentication. After the authentication, the user gains access to a menu for his user group in which he can select the activities that are released for his user group.

The authentication is preferably carried out by: inserting the user card (e.g., "customer card"); checking the user group; entering the postal service customer PIN; checking the post number and postal service customer PIN; and opening the first user group menu.

Recipients with standard user authorization and B2B recipients can pick up shipments at the delivery machine by inserting the user card, or by manually entering the post number and the postal service customer PIN. B2B recipients also can place returned materials there.

Although it is advantageous to assign certain functions only to certain user groups, on the other hand, it is advantageous to make certain basic functions available to most of the user groups. Such basic functions include: dial-in option to a hotline—especially after insertion of a user card, and access to an "End" option, which includes a sign-out of the user of the parcel compartment system and advantageously causes an inserted user card to be returned to the user. The delivery machine should give the user (deliverer) a numerical status on the individual procedure options. If, for example, there are five shipments as return shipments, then "Return shipments (5)" should be displayed. In the menu "Place shipments," the number of free compartments should be displayed. By the same token, in the sub-menu "Indicate defective compartment," the number of defective compartments as well as the compartment numbers should be displayed.

The electronic parcel compartment system shown can be operated in different ways. Especially preferred embodiments of the method are described below.

The method includes an automatic control of functions within the electronic parcel compartment system. These automated functions are preferably linked to a user interface. Although fundamentally all functions can be automated, the implementation of the user interface has the function of being able to vary the method. The user interface contains different menus for the different user groups. Preferably, the individual menu items are displayed in the following order and the corresponding functions are processed within the electronic parcel compartment system. The menu items are advantageously augmented at least partially by status information that is shown between parentheses below.

Standard Deliverers

1. Pick up return shipments (number of return shipments the local postal service provider, e.g., Deutsche Post AG ("DPAG")
2. Place shipments into the compartment—in the case of COD shipments, the sender information is entered by the delivere of the local postal service provider while loading the delivery machine, so that the recipient can see who the sender of a COD shipment is—(number of free compartments per compartment size group of the local postal service provider)
3. Display defective compartment (number of defective compartments of the local postal service provider; compartment number(s))
4. End Recipients Since this user group can only pick up shipments that have been left for them, a menu of possible procedures is redundant. If, at a later point in time, several options become possible for the local postal service customer (e.g., DPAG recipients), then this menu can be modified.

1. All shipments that have been left for the user are listed. In the case of COD shipments, the COD amount and the sender information are displayed. The customer is then prompted to select a shipment. He will then continue by carrying out the procedure "Pick up shipments." If no shipments are present for the signed-in recipient, then this will be displayed to him in the form of "No shipments present."
2. Under the list of shipments, there is the "End" option.

B2B Recipients

1. Since this user group mainly picks up left shipments, this should be displayed analogously to the customer user instructions. The B2B recipient can only pick up shipments from the B2B area. All shipments are listed on the display. All of the shipments are shown that have been left for the user. The B2B recipient is then prompted to select a shipment. He will then continue by executing the procedure "Pick up shipments." If no shipments are present for the signed-in recipient, then this will be displayed to him.
2. Under the list of shipments, there is the option "Place returned materials." After this item has been selected, a compartment size can be selected. The compartment opens and the returned materials (without scanning) can be placed and the compartment can be closed.
3. Under the option "Place returned materials," there is the "End" option.

B2B Deliverers

In contrast to the in-house personnel/special drivers of the local postal service provider (e.g., DPAG) the B2B deliverer is, at the same time, a B2B customer, that is to say, he can also pick up shipments. This leads to the following menu:

1. Pick up returned materials (number of return shipments and returned materials B2B)
2. Pick up shipments (display number of placed shipments)
3. Place shipments (number of free compartments per compartment size group B2B)
4. Open compartment 5. Display defective compartment (number of defective compartments B2B)
6. End Maintenance Technicians The maintenance technicians have a master function and should be able to perform all procedures on the delivery machine. This includes access to the local postal service provider's area and to the B2B area.

The option "Pick up shipments," "Open compartment," and "Display defective compartment" relate to the entire delivery machine of the postal service customers (e.g., Post24) employees.

The following menu results from this:

1. Pick up return shipments (number of return shipments local postal service)
2. Pick up B2B return shipments (number of return shipments B2B)
3. Place shipments (number of free compartments of the local postal service provider)
4. Place B2B shipments (number of free compartments B2B)
5. Pick up shipments (display number of placed shipments)
6. Open compartment
7. Display defective compartment (number of defective compartments)
8. End Delivery Machine Manufacturer Personnel of the delivery machine manufacturer or personnel of companies commissioned by the manufacturer can carry out all necessary tasks in order to provide their services in accordance with the technical service description.

The depiction of the possible procedures is only to be understood by way of an example and can be changed and augmented in accordance with the operational requirements.

The assignment of users to user groups is also advantageous for the access to other functions of the parcel compartment system.

Examples of such functions are presented below:

Picking up Shipments (Standard)

All shipments that are intended for a given recipient are listed according to time in storage (first in—first out). The shipments can then be retrieved one at a time by individual selection on the display (not necessarily according to the time in storage). After the compartment door has closed, this has to be confirmed with "Continue." The shipment list is now automatically updated and shown in the display.

If this is a shipment without COD, it is made ready for retrieval. The compartment opens. The recipient is prompted on the monitor to retrieve the parcel, he removes it and, if applicable, closes the door. There are confirmation fields "Continue" and "No successful retrieval." This information is acquired by the delivery machine and further processed. The updated shipment list is displayed after the confirmation "Continue" as long as there are still shipments present. Then the user menu, in accordance with the user group, is once again displayed.

The payment of COD orders is, if applicable, prescribed by the hardware of the manufacturer of the payment function, that is to say, the card reader and the PIN (personal identified number) field (the menu sequence for the card payment is imaged by the supplier of the card reading devices). These have to be precisely observed. Taking into account the above-mentioned restrictions, the payment procedure should be as follows:

The shipment information with COD sum and sender information is displayed. The user is prompted to insert his credit card or cash card.

If it is a credit card, it is read and the user is prompted to enter the PIN of the credit card. There is a field called "Abort" by means of which the recipient once again returns to the user menu. The recipient has to be clearly informed that he is authorizing a payment by entering his PIN. After it has been entered, a checking procedure is carried out. Once the payment has taken place, the card is ejected. If the retrieval is not successful, the display indicates whether the payment was made or not.

If the PIN of the credit card is not correct, it is requested again for as many times as attempts are permissible.

If it is a cash card, the user only has to confirm the payment, for example, "Make payment" or "Do not make a payment." With "Make payment" the balance on the cash card is reduced, otherwise the display returns to the user menu. If the balance on the cash card is not sufficient, this has to be displayed and the procedure has to be aborted since partial payments cannot be made.

For each completed payment transaction, a receipt is issued indicating the date, time, COD amount, identity code, sender, postal service customers' customer number, and value-added tax. The shipment can now be retrieved.

The postal service customer number is one example of recipient identification information. The data length of the recipient identification information is variable and should preferably be selected in such a way that it can encompass a large number of recipients and also so that additional information can be implemented, for example, a test digit. In the case presented here, it is preferably, for instance, an approximately 10 digit number that is assigned to a recipient during his registration and that, in an advantageous embodiment of the invention, belongs as a name suffix to the delivery address.

After successful payment has been made, or in case of an aborted operation or too many erroneous attempts to enter the PIN, the credit card or cash card is ejected. The recipient is prompted to remove his card. After successfully retrieving a COD shipment, the user can remove his credit card or cash card and leave the delivery machine without logging out with "End." After a predefined time has lapsed, an automatic log-out occurs.

Picking up Shipments (B2B)

After the user has selected a shipment that was deposited for him, the item is prepared for retrieval. The compartment opens. The recipient is prompted on the monitor to remove the item. The confirmation fields "Continue" and "No successful retrieval" appear. The information entered is acquired by the delivery machine and further processed. Then the user menu, depending on the user group, is once again displayed. The retrieval information should already be incorporated here, that is to say, successful retrievals will no longer be displayed and unsuccessful retrievals will be designated as such.

Placing Returned Materials

B2B recipients have the option to place returned materials. If the user has already retrieved a shipment during one log-on session, then he can select that the return shipments be placed in the compartment from which he retrieved his shipment. Subsequently, the available compartments will be cumulatively displayed for each compartment size group.

If no shipment has been retrieved or if the shipment did not fit into the compartment, then the user is shown the free compartments of each compartment size group of the B2B area. He can now select one via the touch screen or he can "Abort" if the shipment is too big for the available compartments. After placing the shipment, the user confirms with "Continue." After this or after "Abort," he once again returns to the user menu.

Placing Shipments (Standard)

a) Placing Normal Shipments

After the selection of the menu item "Place shipments," the post number of the recipient is requested. The post number is the postal service customer number of the recipient of the shipment. This can be scanned or entered manually. There is a field "Abort" via which the user once again returns to the user menu.

After the post number has been entered, the identity code of the shipment is requested; this too, can be either read or entered manually. The user has to be offered a field "Shipment without identity code" since even parcels that do not have an identity code are also going to be delivered to the delivery machine.

There is a field "Abort" via which the user once again returns to the user menu.

With the selection "Shipment without identity code," a selection of the free compartments in the standard area is displayed from which a compartment can be selected. In the case of cyclic elevator systems, this selection can now be effectuated via the available compartment sizes or else via rapid loading. There is a field "Abort" with which the user once again returns to the user menu. Here, it must be taken into account that, in cyclic elevator systems, the assignment to a compartment is effectuated by scanning the identity code and the compartment number.

The user has to indicate "Loading successful," "Compartment too small," or "Abort." With "Abort," he returns to the entry of the customer number and also with "Loading successful," whereby here the shipment is considered to have been placed. In the case of "Compartment too small," the possibility of a larger compartment is sought.

b) COD Shipments Placed

With the entry of the identity code of a COD shipment, by scan or manually, the entry of the COD information is made possible via a special menu item. It has to be possible to enter a COD amount in local currency and to enter sender information. Here, a virtual keyboard has to be available. There is also a field "Abort" via which the user returns to the entry of the post number. Via the delivery machine overview, one can select the compartment, the compartment sizes or rapid loading.

The user has to indicate "Continue," "Compartment too small," or "Abort." By selecting "Abort," the user returns to the entry of the customer number and the same applies to "Loading successful" whereby here, the shipment is considered to have been placed and is only made accessible to recipients in exchange for payment of the COD amount. In the case of "Compartment too small," the possibility of a larger compartment is offered.

Rapid loading can be used with cyclic elevator systems. If this is selected, then an entire compartment section is opened and released for loading. The compartment selection is made by the user and this is indicated to the delivery machine by scanning the compartment number in the case of successful loading. Aside from this compartment selection step, the above-mentioned sequences are the same.

Placing B2B Shipments

After the customer card has been read, the postal service customer PIN has been entered and the menu item "Deliver B2B shipments" has been selected, the post number is requested for which a shipment is to be delivered to the delivery machine. The post number is the postal service customer number of the recipient of the shipment. This can be scanned or entered manually. There is a field "Place shipment" and a field "Abort." With "Abort," the user returns to the user menu. With "Place shipment," the B2B deliverer confirms the entry of the customer number and a compartment selection is displayed of the available compartments (cumulatively according to compartment size groups) of the B2B area. He can now select a larger compartment size or "Abort." (If a compartment selection is not possible, for example, in the case of cyclic elevator systems, then the available compartment sizes are displayed.) Also with cyclic elevator systems, it is possible to load individual compartments. The compartment selected according to number and size is opened and the user can confirm with "Loading successful" or, if applicable, he can request a larger compartment with "Compartment too small," or with "Abort," he can return to the user menu. After "Continue," he returns to the entry of the customer number in order to optionally place additional shipments. If "Compartment too small" is selected, he receives a larger compartment. Here, the user can select between "Continue," "Compartment too small" and "Abort."

Picking Up Return Shipments

Return shipments are shipments that have exceeded the storage period and that are then forwarded or else sent back to the sender.

Standard Return Shipments

After authentication as standard deliverers, the first necessary process step is to display the retrieval of the return shipments and to process them. The deliverer is shown a field "Abort" that allows him to return to the user menu as well as a field "Retrieve return shipment," which releases all return shipments. If the standard deliverer selects this item, then all shipments in the standard area of the delivery machine that are earmarked for return, that is to say, those whose time in storage in the delivery machine has expired, are released to him.

The shipment is designated as having been removed by "Retrieval successful." With "No successful retrieval," the shipment is designated as not having been retrieved. If there are no more return shipments, the user automatically returns to the user menu.

B2B Returned Materials

If the B2B deliverer selects this item, he will be shown all of the shipments in the B2B area that are ready to be returned, that is to say whose time in storage in the delivery machine has expired and all of the shipments designated as "Place returned materials" are listed. He is shown a field "Abort" that allows him to return to the user menu. A field "Remove return shipment" releases a return shipment or returned materials.

With "Continue," the shipment is designated as having been retrieved, with "No successful retrieval," the shipment is designated as not having been retrieved. If there are no more return shipments, the user automatically returns to the user menu.

Open Compartment

Emergency Emptying

The maintenance technician (master) can open all of the compartments in the standard area via this menu item. The following selection criteria are offered: "According to compartment number," "According to identity code," "According to customer number," and "According to system ID."

- "According to compartment number" means the number of the compartment of the delivery machine, something which cannot be possible with cyclic elevator systems since the compartment numbers are not visible.
- "According to identity code" refers to the identity code of the shipment. If, contrary to expectation, there are several shipments with the same identity code, a list is displayed from which a shipment can be selected.

"According to customer number" refers to the postal service customer number. If there are several shipments for the same recipient, a list is displayed from which the shipment can be selected.

"According to system ID" means according to the parcel ID employed in the postal service customers system.

In the selection menu, with the selection criteria and below the list, a field "Abort" should allow a return to the user menu.

If a compartment was selected, the purpose of the opening procedure has to be asked. This can be "For retrieval" or "For checking." If it is an empty compartment that was selected via the compartment number, then the compartment is opened automatically for control purposes. If "For retrieval" is selected, the shipment is designated as having been retrieved and the compartment is released for new shipments.

Open B2B Compartment

The B2B deliverer and the maintenance technician can open compartments in the B2B area via this menu item. The following selection criteria are offered: "According to compartment number," "According to customer number," and "According to system ID."

"According to compartment number" means the number of the compartment of the delivery machine.

"According to customer number" refers to the postal service customer number. If there are several shipments for the same recipient, a list is displayed from which the shipment can be selected.

"According to system ID" means according to the parcel ID employed in the postal service system. There should be no duplicates here.

In the selection menu, together with the selection criteria and below the list, a field "Abort" should allow a return to the user menu.

If a compartment was selected, the purpose of the opening has to be asked. This can be "For retrieval" or "For checking." If it is an empty compartment that was selected via the compartment number, then the compartment is opened automatically for control purposes. If "For retrieval" is selected, the shipment is designated as having been retrieved and the compartment is released for new shipments.

With the delivery machines, especially with cyclic elevator systems, this menu item could be called "Delivery machine defects." In addition, an entry field is made available. For this purpose, a virtual keyboard has to appear on the monitor.

Here, too, there should be a field "Abort" with which the user returns to his user menu.

Overview of Procedures

| Groups | Local Postal Service provider's deliverer | Local Postal Service provider's recipient | B2B recipient | B2B deliverer | Postal service employee | Delivery machine manufacturer |
|---|---|---|---|---|---|---|
| Tasks | | | | | | |
| Authentication | ✓ | ✓ | ✓ | ✓ | ✓ | ✓ |
| Call Center | ✓ | ✓ | ✓ | ✓ | ✓ | ✓ |
| Pick up shipments local postal service provider | ✓ | ✓ | | | ✓ | ⊗ |
| Pick up B2B shipments | | | ✓ | ✓ | ✓ | ⊗ |
| Place returned materials | | | ✓ | | ✓ | ⊗ |
| Deliver shipments local postal service provider | ✓ | | | | ✓ | ⊗ |
| Deliver B2B shipments | | | | ✓ | ✓ | ⊗ |
| Return shipments local postal service provider | ✓ | | | | ✓ | ⊗ |
| B2B return shipments | | | | ✓ | ✓ | ⊗ |
| Open occupied compartment local postal service provider | | | | | ✓ | ⊗ |
| Open occupied B2B compartment | | | | ✓ | ✓ | ⊗ |
| Compartment defective | ✓ | | | ✓ | ✓ | ⊗ |

✓ these procedures are especially advantageous for the certain user groups.
⊗ can be necessary for the fulfillment of the TL. This has to be checked by the delivery machine manufacturer. If applicable, additional procedures not described in this document can be added.

The implementation of these functions can be changed by the manufacturer of the delivery machine, especially as a function of the frequency of maintenance and inspections of the electronic parcel compartment system. Instead of the delivery machine manufacturer, without changing the,above-mentioned functions, other maintenance personnel can have the access rights described.

The foregoing description is given for clearness of understanding only, and no unnecessary limitations should be understood therefrom, as modifications within the scope of the invention may be apparent to those having ordinary skill in the art.

What is claimed is:

1. A method for operating an electronic parcel compartment system, whereby information of users of the electronic parcel compartment system is acquired via a user interface, the method comprising:

assigning a registered user to a user group on the basis of the acquired information wherein the user group comprises a group of registered users having the same access profile to the parcel compartment system;

enabling the registered user of the user group to have access to a selection of several functions of the electronic parcel compartment system via controls of the electronic parcel system depending on the user group to which the registered user belongs, effectuating control of access possibilities, whereby the user is given access to the particular starting menu of his user group, wherein at least one of certain parcel compartments and groups of parcel compartments are accessible only to certain user groups; and activating, after assignment of a registered user to at least one specific user group, a function that causes an essentially simultaneous opening of several parcel compartments.

2. An electronic parcel compartment system with a user interface, the user interface comprising a means for acquiring information from registered users of the electronic parcel compartment system via a user interface, the electronic parcel compartment system comprising:

means for assigning the registered user to user groups on the basis of the acquired information wherein the user group comprises a group of registered users having the same access profile to the parcel compartment system;

a system control that allows a registered user of the user group to have access to a selection of several functions of the electronic parcel compartment system, depending on the user group to which the registered user belongs, and means to effectuate control of access possibilities and means for giving the user access to the particular starting menu of his user group, wherein at least one of certain parcel compartments and groups of parcel compartments are accessible only to certain user groups; and means for activating, after assignment of a registered user to at least one specific user group, a function that causes an essentially simultaneous opening of several parcel compartments.

3. The parcel compartment system of claim 2, wherein the means for assigning the users to user groups makes this assignment on the basis of information transmitted via a data line.

4. The parcel compartment system of claim 2, wherein the means for assigning users to user groups is connected to the user interface in such way that the information acquired from the user interface is available to said means for the assignment of the users.

5. The parcel compartment system of claim 4, wherein the means for assigning the users to user groups makes this assignment on the basis of information transmitted via a data line.

6. The parcel compartment system of claim 2, wherein the assignment to the user groups is performed by acquiring user identification information and by making a comparison of the user identification information to an entry in a database.

7. The parcel compartment system of claim 2, wherein different access authorizations to functions of the electronic parcel compartment system can be selected for different user groups.

8. The parcel compartment system of claim 2, wherein the assignment of the parcel compartments to the user groups can be changed.

* * * * *